United States Patent [19]

Sasaki et al.

[11] Patent Number: 5,084,660
[45] Date of Patent: Jan. 28, 1992

[54] NC COMMAND SYSTEM

[75] Inventors: Takao Sasaki, Hachioji; Kunihiko Murakami, Hino, both of Japan

[73] Assignee: Fanuc, Ltd., Minamitsuru, Japan

[21] Appl. No.: 476,412

[22] PCT Filed: Sep. 29, 1989

[86] PCT No.: PCT/JP89/01000
  § 371 Date: May 30, 1990
  § 102(e) Date: May 30, 1990

[87] PCT Pub. No.: WO90/04220
  PCT Pub. Date: Apr. 19, 1990

[30] Foreign Application Priority Data

Oct. 11, 1988 [JP] Japan .................... 63-255250

[51] Int. Cl.$^5$ ............................ G05B 19/18
[52] U.S. Cl. ..................... 318/569; 364/474.21
[58] Field of Search ............ 318/569, 568.1, 568.2, 318/568.25, 474.21; 364/474.01, 474.23, 82

[56] References Cited

U.S. PATENT DOCUMENTS

| 4,092,720 | 5/1978 | Carey | 364/474.23 |
| 4,351,096 | 9/1982 | Depweg et al. | 82/118 |
| 4,558,419 | 12/1985 | Kanematsu et al. | 318/569 X |
| 4,631,684 | 12/1986 | Akasofu et al. | 364/474.01 |
| 4,683,786 | 8/1987 | Kersten et al. | 82/118 |
| 4,794,514 | 12/1988 | Hideaki et al. | 364/474.21 X |

Primary Examiner—William M. Shoop, Jr.
Assistant Examiner—Saul M. Bergmann
Attorney, Agent, or Firm—Staas & Halsey

[57] ABSTRACT

Disclosed is an NC command system of a CNC lathe having a plurality of tool posts, the position of which can be independently controlled, and a plurality of spindles an rpm of which can be independently controlled, wherein a coupling relationship during machining by the spindles (3, 5) and the tool posts (1, 2) can be established and switched by a machining program, and thus a more effective machining can be realized.

2 Claims, 3 Drawing Sheets

NC COMMAND SYSTEM

TECHNICAL FIELD

The present invention relates to an NC command system of a computerized numerical control (CNC) lathe, and more specifically, to a NC command system which enables a coupling relationship during machining to be established between a plurality of spindles and a plurality of tool posts to be switched by a machining program.

BACKGROUND ART

Generally, CNC lathes and the like are provided with a plurality of spindles and a plurality of tool posts and machine a plurality of workpieces with a plurality of tools to increase the machining speed thereof.

In these CNC lathes, the spindles are fixedly coupled to the tool posts, and thus machining can be carried out, for example, only by a first spindle coupled to a first tool post and a second spindle coupled to a second tool post.

Consequently, although a plurality of the spindles are provided, there is a limit to the effective machine of the workpieces at a high speed. For example, when the machining of a first workpiece takes a long time but a second workpiece is machined in a short time, the machining can be effectively carried out in such a manner that the first workpiece is partially machined by the second tool post.

Further, sometimes a requirement for machining a workpiece mounted on a second spindle by a tool mounted on a first tool post arises, depending on the structure of a machine.

DISCLOSURE OF THE INVENTION

Taking the above into consideration, an object of the present invention is to provide an NC command system which enables a coupling relationship during machining to be established between a plurality of spindles and a plurality of tool posts to be switched by a machining program.

To solve the above problem, in accordance with the present invention, there is provided an NC command system of a CNC lathe having a plurality of tool posts, the position of which can be independently controlled, and a plurality of spindles, the angular velocity, that is the rpm, of which can be independently controlled, wherein a coupling relationship during machining of the spindles and the tool posts can be established by switching carried out through a machining program.

The machining efficiency can be improved by enabling a coupling relationship during machining to be established between the spindles and the tool posts to be switched by the machining program. cl BRIEF DESCRIPTION OF THE DRAWINGS FIG. 1 is a diagram showing a relationship between the spindles and the tool posts of a CNC lathe according to the present invention, when provided with two spindles and two tool posts;

BEST MODE OF CARRYING OUT THE INVENTION

An embodiment of the present invention will be described below with reference to the drawings.

Figure 1:
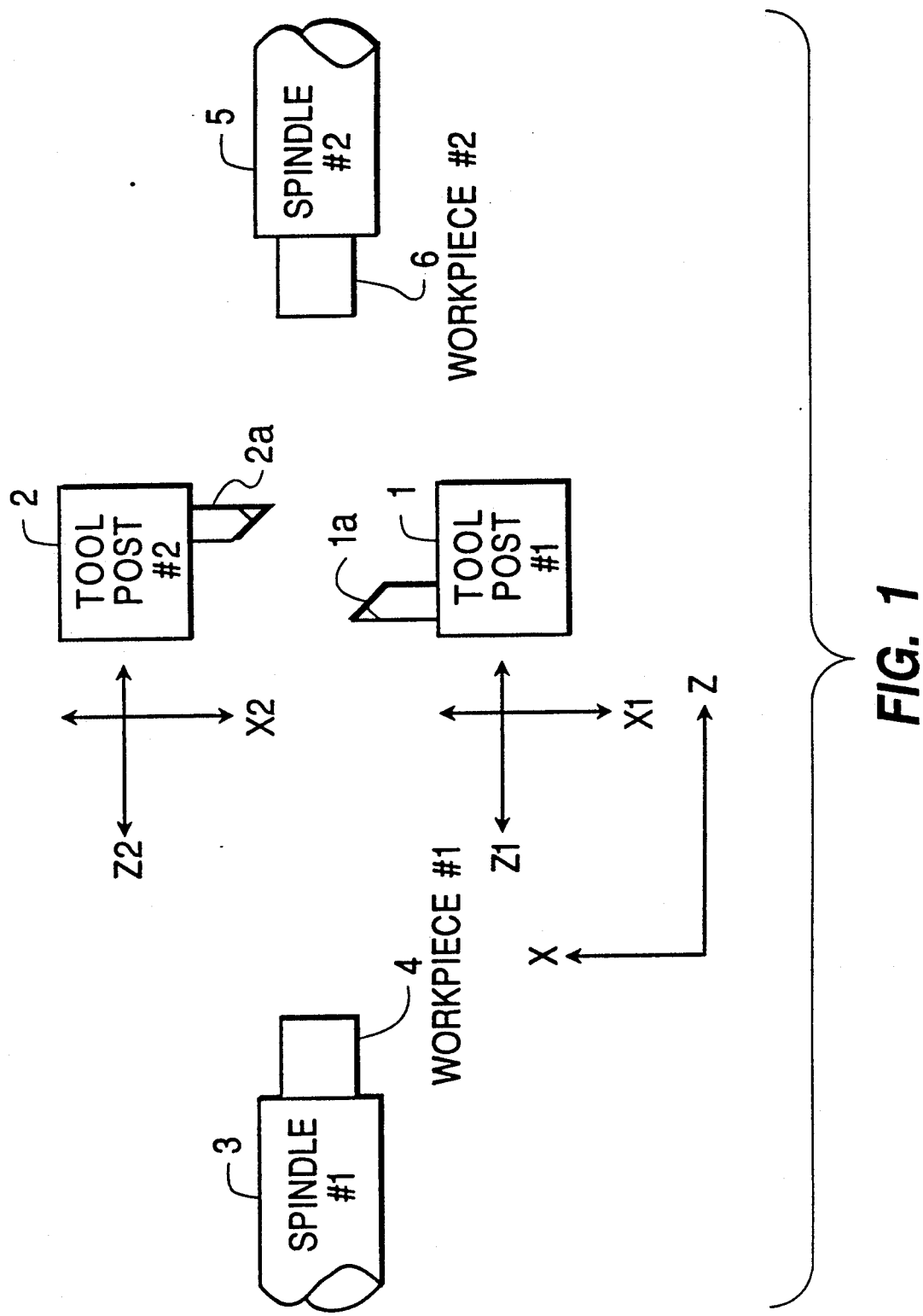

FIG. 1 shows a relationship between the spindles and the tool posts of a CNC lathe provided, for example, with two spindles and two tool posts, wherein 1 designates a first tool post having a tool 1a and controlled in X and Z directions along X1 and Z1 axes; 2 designates a second tool post having a tool 2a and controlled in the X and Z directions along X2 and Z2 axes; 3 designates a first spindle on which a first workpiece 4 is fixed; and 5 designates a second spindle on which a second workpiece 6 is fixed.

A coupling relationship between the tool posts and the spindles is established by a machining program. For example, it is assumed that the first workpiece 4 is machined by the tool 1a of the first tool post 1 and the second workpiece 6 is machined by the tool 2a of the second tool post 2.

At this time, a machining program is determined for each tool post. For example, a machining program having an odd program number controls the position of the first tool post and a machining program having an even program number controls the position of the second tool post.

When the first workpiece 4 is machined by the tool 1a of the first tool post, a machining program of the first tool post, i.e., the machining program having an odd program number, is set to a first spindle control mode. Similarly, when the second workpiece 6 is machined by the tool 2a of the second tool post, a machining program of the second tool post, i.e., the machining program having an even program number is set to a second spindle control mode.

Figure 2:
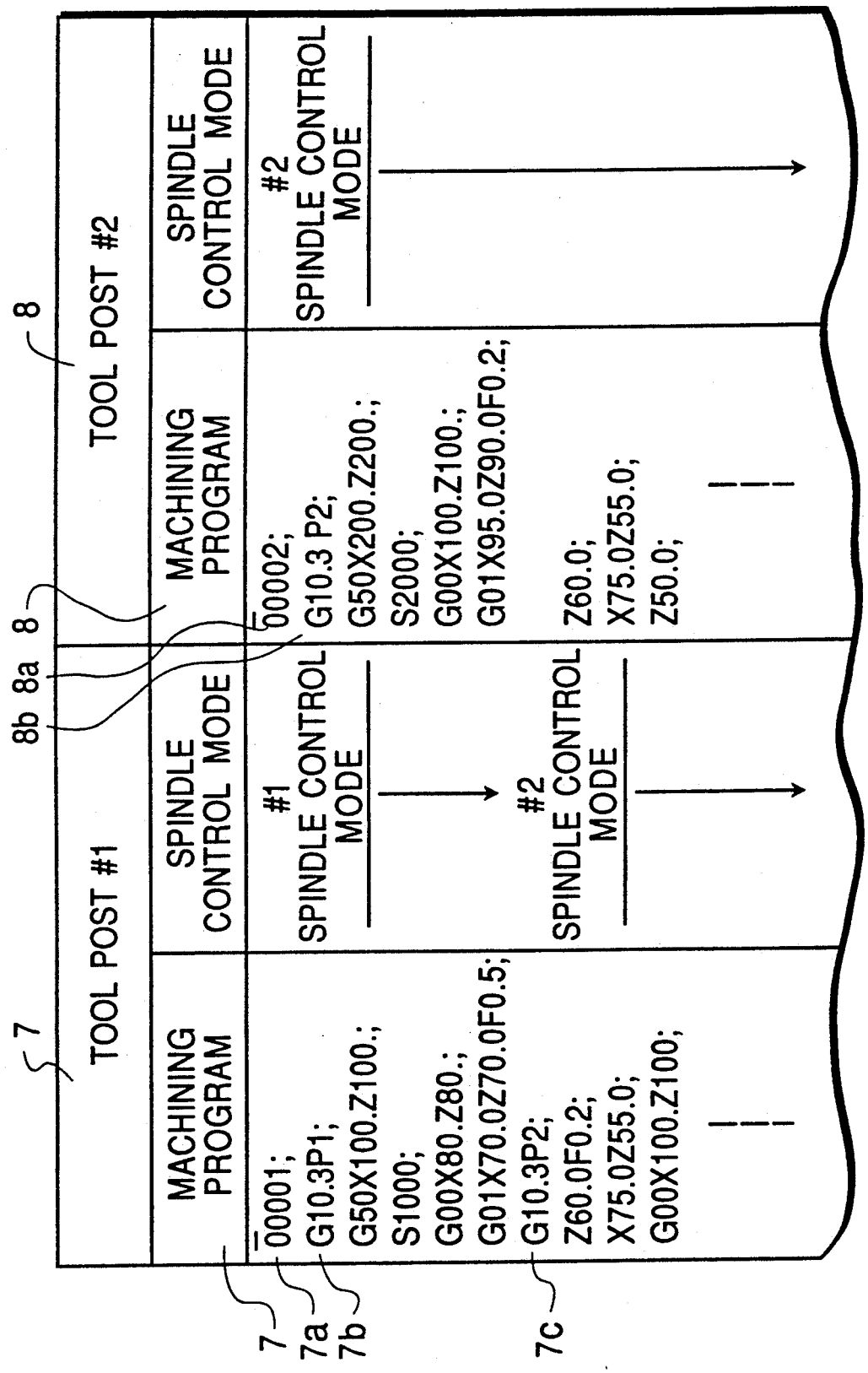
FIG. 2 is a diagram showing an example of a machining program.

FIG. 2 shows an example of the machining programs, wherein 7 designates a machining program for controlling the first tool post 1, the program number 7a of which is an odd number "00001"; and 8 designates a machining program for controlling the second tool post 2, the program number of which is an even number "00002". These machining programs 7 and 8 are executed in series.

Designated at 8b is a G code for selecting the spindle control modes, wherein P2 means that the second spindle is selected, and thus the spindle control mode of the second tool post is set to the second spindle control mode.

As a result, the first workpiece is machined by the tool 1a of the first tool post, and the second workpiece is machined by the tool 2a of the second tool post.

Designated at 7c is a G code for selecting the spindle control modes, wherein P2 means that the second spindle is selected, and thus the second workpiece is machined by the tool of the first tool post and the tool of the second tool post, by the command 7c and the commands subsequent thereto.

Note that, although an M function or the like is used to synchronize the operation of the first and second tool posts, it is not described herein.

In addition to the above combination of the spindles and the tool posts, the second workpiece 6 can be machined by the tool 1a of the first tool post, the first workpiece can be machined by the tool 2a of the second tool post 2, or the first workpiece 4 can be simultaneously machined by the tool 1a of the first tool post and the tool 2a of the second tool post.

Figure 3:
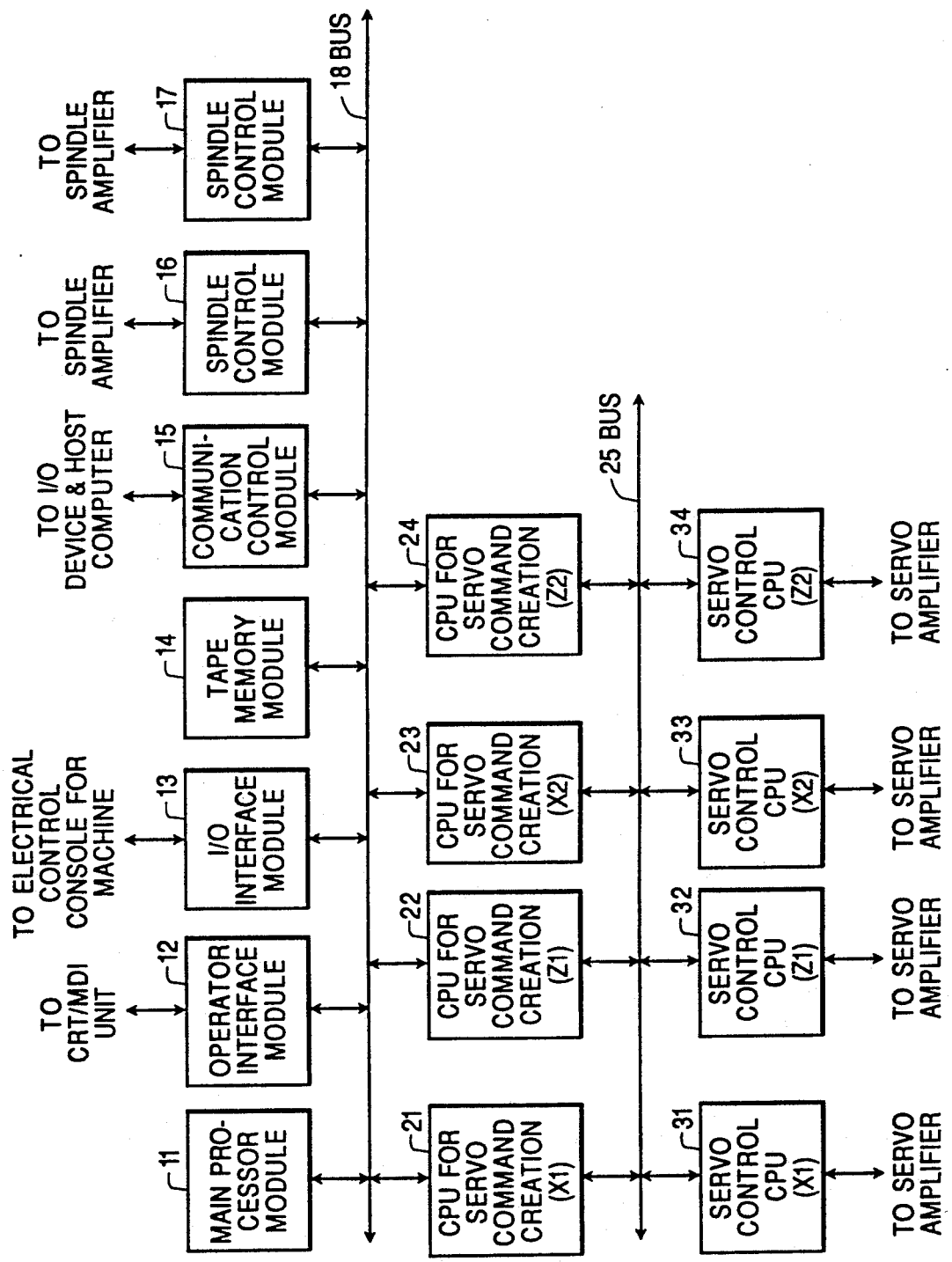
FIG. 3 is a block diagram of a numerical control apparatus embodying the present invention.

FIG. 3 shows a block diagram of a numerical control apparatus embodying the present invention, wherein 11 designates a main processor module for controlling the CNC lathe as a whole, which effects all control except for a servo command. Although the main processor module is shown as a single arrangement in the figure, a plurality of main processor modules may be used in accordance with the size of the system.

Designated at 12 is an operator interface module connected to a CRT/MDI unit including a display unit and a keyboard, and designated at 13 is an input/output interface module for receiving input signals from the CNC lathe and outputting signals for driving the magnets and the like of an electrical control console of the machine.

Designated at 14 is a tape memory module for storing machining programs and includes, as memory elements, bubble memories and RAMs to which power is supplied from a battery.

Designated at 15 is a communication control module through which a host computer is connected to the numerical control apparatus to manage the machining processes, receive the machining program, and transmit machining data. Further, I/O devices such as a floppy drive, a hard disc drive and the like can be connected to the communication control module. Designated at 16 and 17 are spindle control modules connected to a spindle amplifier for controlling the rpm, orientation, and the like of the spindles.

Designated at 21 to 24 are servo command creation processors for receiving the data of the machining program from the main processor 1 and creating servo commands for the X1, Z1, X2, and Z2 axes of FIG. 1. Designated at 25 is a bus through which only a servo command or data regarding servo is transmitted.

Designated at 31 to 35 are servo control processors connected to respective servo amplifiers for controlling the X1, Z1, X2, and Z2 axes, respectively.

As described above, according to the present invention, since a coupling relationship during machining can be established between the spindles and the tool posts can be commanded by the machining program, a more effective machining can be realized.

We claim:

1. A method of controlling a CNC lathe having a plurality of independently controlled tool posts and a plurality of independently controlled splindles comprising the steps of:

providing a machining program for each of the tool post;

providing a spindle selection code in each of the machining programs; and selecting a spindle control mode in accordance with one of the spindle selection codes whereby respective ones of the tool posts are associated with corresponding ones of the spindles during machining.

2. A method according to claim 1, wherein said code comprises a G code.